United States Patent
Bills et al.

(10) Patent No.: US 8,600,688 B2
(45) Date of Patent: Dec. 3, 2013

(54) GEOMETRICALLY BASED BUTTON DISCRIMINATION IN CAPACITIVE SENSING APPLICATIONS

(75) Inventors: Peter J. Bills, Scottsdale, AZ (US); Lenard L. Milholland, Jr., Tucson, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 349 days.

(21) Appl. No.: 13/049,932

(22) Filed: Mar. 17, 2011

(65) Prior Publication Data
US 2012/0239327 A1    Sep. 20, 2012

(51) Int. Cl.
*G06F 19/00* (2011.01)

(52) U.S. Cl.
USPC .............................. 702/65; 345/173; 345/174

(58) Field of Classification Search
USPC ................. 702/41, 47, 65, 150; 345/173, 174; 324/660, 686
See application file for complete search history.

(56) References Cited

U.S. PATENT DOCUMENTS

| | | |
|---|---|---|
| 4,806,709 A | 2/1989 | Evans |
| 6,879,930 B2 | 4/2005 | Sinclair et al. |
| 7,382,139 B2 | 6/2008 | Mackey |
| 7,663,607 B2 | 2/2010 | Hotelling et al. |
| 7,688,080 B2 | 3/2010 | Golovchenko et al. |
| 7,714,847 B2 | 5/2010 | Hsu et al. |
| 7,737,953 B2 | 6/2010 | Mackey |
| 7,876,309 B2 | 1/2011 | XiaoPing |
| 7,932,897 B2 | 4/2011 | Elias et al. |
| 2007/0247443 A1 | 10/2007 | Philipp |
| 2008/0079699 A1 | 4/2008 | Mackey |
| 2010/0117985 A1 | 5/2010 | Wadia |
| 2010/0156811 A1 | 6/2010 | Long et al. |
| 2010/0295564 A1 | 11/2010 | Reynolds |
| 2010/0295813 A1 | 11/2010 | Kent |
| 2010/0328248 A1 | 12/2010 | Mozdzyn |
| 2011/0007011 A1 | 1/2011 | Mozdzyn |
| 2011/0157029 A1* | 6/2011 | Tseng ........................... 345/173 |
| 2011/0248947 A1* | 10/2011 | Krahenbuhl et al. ......... 345/174 |

OTHER PUBLICATIONS

Bohn, Bruce, "Microchip CTMU for Capacitive Touch Applications," Microchip Technology Inc., AN1250, 22 pages, 2009.

* cited by examiner

*Primary Examiner* — John H Le
(74) *Attorney, Agent, or Firm* — King & Spalding L.L.P.

(57) ABSTRACT

Geometrically based system and method for receiving capacitive sensory input. User input may be received by a capacitive sensing pad. A signal may be generated by the capacitive sensing pad. The signal may indicate a size of an area in which the user input is received. The signal may be received by an input composed in processing circuitry and coupled to the capacitive sensing pad. A location of the user input may be determined by the processing circuitry based on the signal.

20 Claims, 3 Drawing Sheets

US 8,600,688 B2

GEOMETRICALLY BASED BUTTON DISCRIMINATION IN CAPACITIVE SENSING APPLICATIONS

FIELD OF THE INVENTION

The present invention relates to the field of electronic devices, and more particularly to a geometrically based method for receiving capacitive sensory input.

DESCRIPTION OF THE RELATED ART

It has been a high priority for many electronics manufacturers to offer user interfaces that are powerful yet simple to use, while remaining highly reliable. Some of the more popular interfaces have been touchscreens and touchpads. Touchscreens and touchpads can typically detect the location of touches within the display/pad area, allowing the display/pad to be used as an input device, and in the case of touchscreens, making it possible for the user to directly interact with the display's content. Such displays/pads can be attached to computers, and have become more and more prevalent in recent personal digital assistants (PDAs), laptop computers, and satellite navigation and mobile phone devices, making these devices more user-friendly and effective.

Many touchscreens/touchpads are designed based on capacitive sensing principles. Such touchscreens/touchpads may feature a panel coated with a material that conducts a continuous electrical current across the sensor, which exhibits a precisely controlled field of stored electrons in both the horizontal and vertical axes to achieve capacitance. When the sensor's normal capacitive field (considered its reference state) is altered by another capacitive field, for example someone's finger, electronic circuits measure the resultant distortion in the characteristics of the reference field, and send the information about the event to a controller for processing. Capacitive sensors can either be touched with a bare finger or with a conductive device being held by a bare hand.

Capacitive sensing products typically use one printed circuit board (PCB) pad per capacitive sensing input. It is also common to use a matrix of capacitive sensing inputs to reduce the number of capacitive sensing inputs required relative to the number of pads. For example; a 3×3 matrix can read 9 pads while only using 6 cap sense inputs. The matrix method works well with one pad activated at a time. However, with multiple pads pressed in two different rows' or columns', the integrated circuit (IC) can not distinguish which pads are depressed in a particular row or column.

Capacitive sensing products are also commonly used for slider applications, in which multiple inputs are used to detect direction (e.g., to increase or decrease volume). However, using multiple inputs to accomplish the slider function forces a system designer to use a device with a greater number of inputs. Improvements in capacitive sensing products would be desirable in light of these drawbacks.

SUMMARY OF THE INVENTION

Various embodiments are described of a geometrically based system and method for receiving capacitive sensory input. By advantageously designing the geometry of a capacitive sensing system according to the embodiments described herein, the capacitive sensing system may accurately and effectively receive user input for a variety of touch-sense applications (such as slider applications and multi-touch applications), with a simpler and more elegant design than would otherwise be required.

The system may be any electronic device utilizing capacitive sensing inputs (referred to herein as "capacitive sensing pads" or "capacitive sensing buttons"). For example, the electronic device may be a mobile device such as a cellular telephone or smart phone. Alternatively, the electronic device may be a portable computer such as a tablet computer or laptop.

The system may include one or more capacitive sensing pads configured to receive user input in a capacitive manner and generate signals in response to receiving user input. The system may also include processing circuitry including one or more inputs coupled to the capacitive sensing pad(s). The processing circuitry may be configured to interpret user input based on signals received from capacitive sensing pads via its input(s). The system may be configured to implement the method, which may be performed as follows.

A first user input may be received by a first capacitive sensing pad. A first signal may be generated by the first capacitive sensing pad in response to receiving the first user input. The first signal may indicate a size of an area in which the first user input is received.

A first input coupled to the first capacitive sensing pad may receive the first signal. The first input may be composed in processing circuitry, which may determine a location of the first user input based on the first signal, e.g., based on the indication of the size of the area in which the first user input is received.

A second signal may be received by the first input. The second signal may indicate a size of an area in which second user input is received. The size of the area in which the second user input is received may be different than the size of the area in which the first user input is received. The processing circuitry may be configured to determine a location of the second user input based on the second signal, e.g., based on the indication of the size of the area in which the second user input is received.

In some embodiments, the second user input may also be received by the first capacitive sensing pad, which may generate the second signal based on receiving the second user input. The processing circuitry may in this case be configured to determine a direction of movement along the first capacitive sensing pad based on the first signal and the second signal, e.g., based on a difference between the sizes of the areas in which the first and second user inputs are received, as indicated by the first and second signals. This determination may be based on the shape of the first capacitive sensing pad; for example, the first capacitive sensing pad may be in the shape of an acute triangle, or another shape such that user input to different portions of the first capacitive sensing pad may predictably yield different sized areas in which user input is received.

In some embodiments, the second user input may be received by a second capacitive sensing pad, which may generate the second signal based on receiving the second user input. The second capacitive sensing pad may be differently sized than the first capacitive sensing pad. Thus, the processing circuitry may determine the locations of the first and second user inputs based on the indications of the sizes of areas of the first and second user inputs (as indicated by the first and second signals respectively) corresponding to the sizes of the first and second capacitive sensing pads respectively.

In addition, in some embodiments the first and second user inputs may be received at the first and second capacitive sensing pad simultaneously. In this case the first and second signals may also be received at the first input simultaneously. For example, the first input may receive the first and second signal additively (e.g., the first and second capacitive sensing pads may be coupled to the first input in parallel). Thus, the first input may receive a signal which is a combination of the first and second signal, and accordingly may be indicative of the size of the total area in which user inputs are received (i.e., the area in which the first user input is received and the area in which the second user input is received). The processing circuitry may determine that the first user input is received at the first capacitive sensing pad and the second user input is received at the second capacitive sensing pad simultaneously based on receiving the first signal and the second signal simultaneously.

BRIEF DESCRIPTION OF THE DRAWINGS

A better understanding of the present invention can be obtained when the following detailed description of the preferred embodiment is considered in conjunction with the following drawings, in which.

Figure 1:
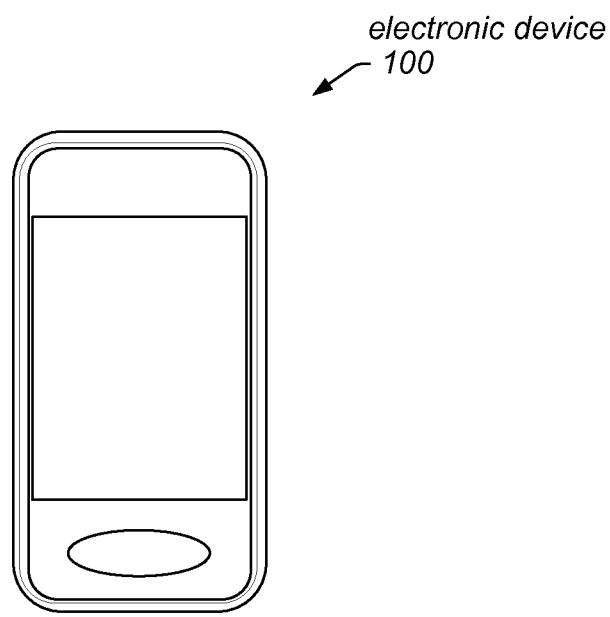
FIG. 1 illustrates an exemplary electronic device according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

FIG. 1—Exemplary Electronic Device with Capacitive Sensor(s)

FIG. 1 illustrates an exemplary electronic device 100 according to one embodiment. The electronic device 100 may be any type of electronic device implementing capacitive sensing inputs. For example, the electronic device 100 may be a mobile device such as a cellular telephone or smart phone. Alternatively, the electronic device 100 may be a portable computer such as a tablet computer or laptop. The above-described electronic devices are exemplary only and any device utilizing capacitive sensing inputs may be within the scope of this disclosure.

As shown, the electronic device 100 may include a display. The display may also serve as a user interface portion, e.g., the display may serve as a touchscreen. Alternatively, the electronic device 100 may include a separate user interface portion, e.g., a touchpad, or a combination of one or more touchscreens and one or more touchpads. The electronic device 100 may also include a keyboard and/or any of a variety of other means of receiving user-input, in some embodiments.

The user interface portion (e.g., touchscreens and/or touchpads) may include one or more capacitive sensing inputs configured to receive user input by detecting variations in a generated electric field. For example, the capacitive sensing inputs (which may also be referred to herein as "capacitive sensing pads" or "capacitive sensing buttons") may include conductive material configured to form one or more capacitors upon excitation. Each capacitive sensing input could, for example, include a printed circuit board (e.g., including conductive copper traces). Variations in the strength of the electric field (e.g., variations in capacitance) caused by disturbances (such as contact by or proximity to a human finger or other conductive input mechanism) may be measured and/or transmitted to an input in processing circuitry, which may be configured to interpret such signals. Numerous variations in the details of the implementation of the capacitive sensing inputs may be possible and should be considered within the scope of this disclosure.

The electronic device may also include processing circuitry for interpreting user input signals. For example, as noted above, signals generated by capacitive sensing inputs based on user input may be received by the processing circuitry via one or more inputs. The processing circuitry may also be configured to receive and interpret other user input signals, and/or perform other processing functions. The processing circuitry may be implemented as hardware (e.g, an integrated circuit), as software (e.g., a processor and memory medium including program instructions executable by the processor), or a combination of hardware and software, as desired.

Figure 2:
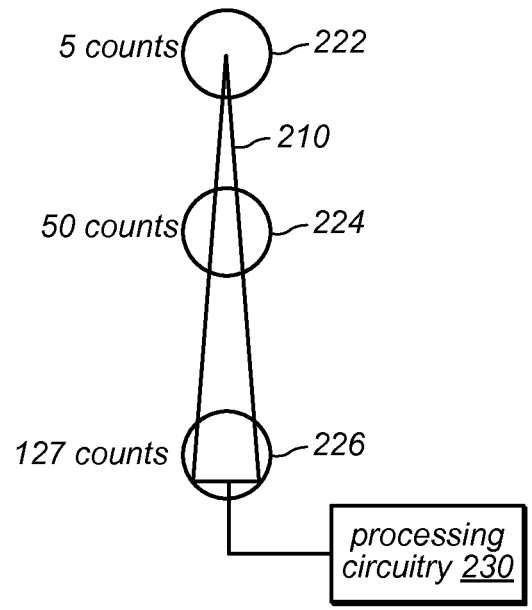
FIGS. 2-3 are block diagrams illustrating capacitive sensor implementations utilizing geometrically based button discrimination according to one embodiment.
Figure 3:
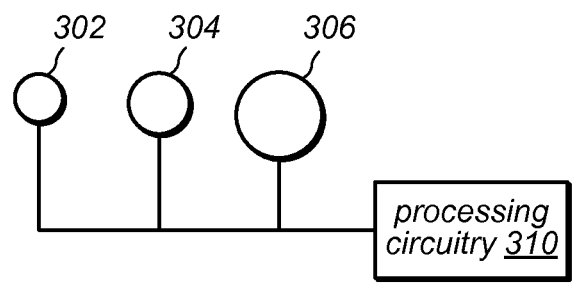

FIGS. 2-3—Block Diagrams Illustrating Capacitive Sensor Implementations Utilizing Geometrically Based Button Discrimination FIGS. 2 and 3 are block diagrams illustrating exemplary implementations of geometrically based capacitive sensing button discrimination according to two sets of embodiments. In both cases, capacitive sensing pads may be configured to receive user input and generate signals in response to receiving user input. The capacitive sensing pads may be coupled to processing circuitry, which may be configured to receive the signals generated by the capacitive sensing pads and interpret the received user input based on the signals received from the capacitive sensing pads. According to various embodiments, any of the geometrically based capacitive sensing button discrimination implementations described below with respect to FIGS. 2 and 3, and any variations thereof, may be implemented in the electronic device 100 shown in FIG. 1, or any of a variety of other electronic devices. It should also be noted that the sets of embodiments described with respect to FIGS. 2 and 3 and any variations thereof may be implemented individually or in combination (e.g., in the same electronic device), as desired.

The exemplary embodiments of FIGS. 2 and 3 are described below with respect to a system in which signal strength is converted to a digital scale, e.g., in which signal strength may be given in a number of 'counts' out of a maximum total number of counts. Such a system might, for example, utilize a 128 count scale ranging from 0 counts to 127 counts. It should be noted that this system is exemplary only and other means of measuring signal strength (e.g., analog signal strength measurement systems, digital signals strength measurement systems utilizing a different scale, or other possible systems) are also envisioned.

According to a first set of embodiments, a capacitive sensing pad is shaped in a manner such that input to different portions of the capacitive sensing pad produce different signal strengths. An exemplary implementation of such an embodiment is illustrated in FIG. 2, in which the capacitive sensing pad 210 is in the shape of an acute triangle. This set of embodiments may be particularly useful for slider implementations, e.g., for scroll bars, volume control, or any of a variety of other applications. Other applications are also envisioned.

In this case, the signal strength of the signal produced by a user input (e.g., a touch of a finger) may be related to a location on the capacitive sensing pad 210 in a known manner. For example, the signal strength may be proportional to an amount of area of the capacitive sensing pad in which the user input is received. Thus, in the exemplary implementation illustrated in FIG. 2, user input 222 received at the narrow end of the capacitive sensing pad 210 may produce a smaller signal (e.g., 5 counts out of a possible 127 counts), while user input 226 received at the broad end of the capacitive sensing pad 210 may produce a larger signal (e.g., 127 counts out of a possible 127 counts); user input 224 in between the ends of the capacitive sensing pad 210 may produce a signal with an intermediate strength (e.g., 50 counts out of a possible 127 counts).

The processing circuitry 230 receiving signals from the capacitive sensing pad 210 may thus be able to determine the relative location of user input to the capacitive sensing pad 210 based on the signal strength of received signals. More particularly, the processing circuitry 230 may be able to determine a direction of movement of user input along the capacitive sensing pad 210 based on changing strength of received signals. For example, an increasing signal strength may be indicative of movement along the capacitive sensing pad 210 from the narrow end to the broad end, while a decreasing signal strength may be indicative of movement along the capacitive sensing pad 210 from the broad end to the narrow end.

In some embodiments, the processing circuitry 230 may further be able to determine an amount and/or speed of movement along the capacitive sensing pad 210, e.g., based on initial and final signal strengths and/or rate of change of signal strength. The processing circuitry 230 may interpret the signals and respond to the received user input accordingly. For example, if the capacitive sensing pad 210 is implemented in a volume control slider application, the processing circuitry 230 may interpret the direction, speed, and/or range of motion along the capacitive sensing pad 210 as a command to increase or decrease (e.g., based on an interpreted direction of user input along the capacitive sensing pad 210) a volume of the electronic device 100 by a certain amount (e.g., based on an interpreted range of motion of user input along the capacitive sensing pad 210) at a certain rate (e.g., based on an interpreted speed of motion of user input along the capacitive sensing pad 210). Other implementations and applications are also envisioned.

A system in which a capacitive sensing pad is shaped in a manner such that input to different portions of the capacitive sensing pad produce different signal strengths, such as the system of FIG. 2, may advantageously allow for determination of direction of movement of user input using a single capacitive sensing pad coupled to a single input in processing circuitry. In particular, such a system compares favorably with prior art systems in which a plurality of capacitive sensing pads coupled to a plurality of inputs in processing circuitry are required in order to determine direction of movement of user input.

According to a second set of embodiments, a plurality of differently sized capacitive sensing pads may be coupled to a single input in processing circuitry. Because the capacitive sensing pads are differently sized, each capacitive sensing pad may produce signals of different strengths in response to user input, thereby allowing the processing circuitry to differentiate between user input received by the different capacitive sensing pads despite receiving signals from all of the capacitive sensing pads via the same input.

FIG. 3 is a block diagram illustrating one such embodiment, in which three capacitive sensing pads (302, 304, 306) are coupled to a single input in processing circuitry 310. In other words, the capacitive sensing pads 302, 304, 306 may be terminated in parallel at the processing circuitry 310; this may allow signals from the capacitive sensing pads 302, 304, 306 to be received by the processing circuitry 310 in an additive manner. As shown in FIG. 3, the capacitive sensing pads 302, 304, 306 may be substantially circular in shape; however, a variety of other shapes (e.g., rectangles, triangles, irregular shapes, etc.) may alternatively or additionally be used, as desired.

The capacitive sensing pads 302, 304, 306 may be sized in a configuration that allows for the processing circuitry 310 to uniquely identify which of the capacitive sensing pads 302, 304, 306, individually or in combination, has received user input. As one example, if the area of capacitive sensing pad 302 is such that user input produces 18 counts, while the area of capacitive sensing pad 304 is such that user input produces 36 counts, and the area of capacitive sensing pad 306 is such that user input produces 72 counts, each of the eight possible user input combinations is uniquely identifiable by the total signal strength, as illustrated in Table 1 below:

TABLE 1

Possible user input combinations and corresponding signal strength

| | | | | | | | | |
|---|---|---|---|---|---|---|---|---|
| 18 count size pad | 0 | 18 | 0 | 18 | 0 | 18 | 0 | 18 |
| 36 count size pad | 0 | 0 | 36 | 36 | 0 | 0 | 36 | 36 |
| 72 count size pad | 0 | 0 | 0 | 0 | 72 | 72 | 72 | 72 |
| total count (signal strength) | 0 | 18 | 36 | 54 | 72 | 90 | 108 | 126 |

Because the total signal values produced by the possible user inputs are evenly distributed across the range of sensitivity of the system, this system may allow a maximum tolerance for variation (e.g., due to environmental conditions, user habits, etc.) given the number of possible input combinations. However, different relative pad sizes may be used if desired. It should also be noted that although the exemplary system of FIG. 3 illustrates three capacitive sensing pads 302, 304, 306 coupled to a single input, alternate embodiments in which two, four, or any number of (e.g., differently sized) capacitive sensing pads may be connected to a single input are also envisioned.

In some embodiments, capacitive sensing pads 302, 304, 306 may be sized such that user inputs may typically be received in substantially the entire sensitive area of capacitive sensing pads 302, 304, 306; for example, if capacitive sensing pads 302, 304, 306 are designed to receive user input via human fingers, each pad may be sufficiently smaller than a typical human finger that such a finger would reasonably be expected to cover the entire sensitive area of a desired capacitive sensing pad when providing user input.

A system utilizing a plurality of differently sized capacitive sensing pads coupled to a single input in processing circuitry, such as the system of FIG. 3, may advantageously allow for reliable distinction of multi-touch user inputs. In particular, such a system may utilize a smaller number of inputs in processing circuitry than prior art systems in which signals from each capacitive sensing input must be received by processing circuitry at a unique input in order for the processing circuitry to be able to reliably distinguish between multiple user inputs, while more reliably identifying multi-touch inputs than prior art systems which utilize matrices of capacitive sensing pads to reduce the required number of inputs to processing circuitry.

Figure 4:
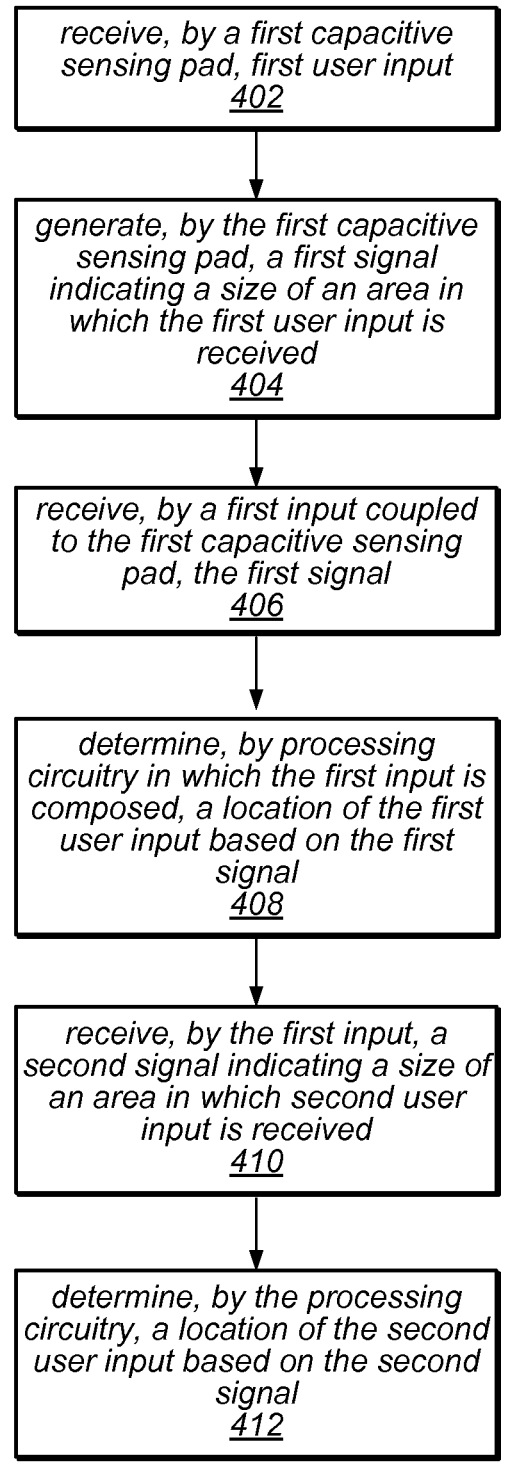
FIG. 4 is a flowchart diagram illustrating one embodiment of a geometrically based method for receiving capacitive sensory input.

FIG. 4—Geometrically Based Method for Receiving Capacitive Sensory Input

FIG. 4 is a flowchart diagram illustrating an exemplary geometrically based method for receiving input at an electronic device using capacitive sensors. The method shown in FIG. 4 may be used in conjunction with any of the electronic devices shown in the above Figures, among other devices. In various embodiments, some of the method elements shown may be performed concurrently, performed in a different order than shown, or omitted. Additional method elements may also be performed as desired. As shown, this method may operate as follows.

In 402, first user input may be received by a first capacitive sensing pad. The first user input may include the touching of or bringing in close proximity to the first capacitive sensing pad by a finger or any other user-controlled object capable of triggering the first capacitive sensing pad.

In 404, a first signal may be generated by the first capacitive sensing pad. The first signal may be generated based on the first user input. For example, the proximity or touch of a finger or other conductive user input mechanism may disturb the electric field of the first capacitive sensing pad, thereby directly generating the first signal. Alternatively, the first signal may be generated indirectly as a result of the first user input; for example, the disturbance caused by the first user input may be measured and the first capacitive sensing pad may generate the first signal based on the measurement of the disturbance caused by the first user input.

In some embodiments, the first signal may indicate a size of an area in which the first user input is received. For example, the first signal may be indicative of an amount of area of contact between the user input mechanism (e.g., a human finger) and the capacitive sensing pad. In some embodiments, the strength of the first signal may be directly related to the size of the area in which the first user input is received. Alternatively, the first signal may simply be a signal (e.g., a digital signal) including information indicating the size of the area in which the first user input is received.

In 406, the first signal may be received by a first input coupled to the capacitive sensing pad. The first input may be composed in processing circuitry. In some embodiments, the processing circuitry may include a plurality of inputs for receiving user input, e.g., from capacitive user inputs and/or other forms of user input. Alternatively, the first input may be the only input in the processing circuitry for receiving user input, if desired. The processing circuitry may perform one or more processing operations on the received first signal in order to interpret and respond to the first user input.

For example, in 408, a location of the first user input may be determined by the processing circuitry. The location of the first user input may be determined based on the first signal. In some embodiments, the system may be designed such that the size of the area in which the first user input is received may be used to identify the location of the first user input; thus, in some embodiments, the processing circuitry may determine the location of the first user input based on the first signal's indication of the size of the area in which the first user input is received.

For example, the first capacitive sensing pad and the processing circuitry may be part of a system such as the one shown in and described with respect to FIG. 2, or a similar system. In this case the first capacitive sensing pad may be an acute triangular (or other shape of varying width) pad in which the size of the area in which the first user input is received is indicative of the relative location of the first user input on the first capacitive pad.

As another example, the first capacitive sensing pad and processing circuitry may be part of a system such as the one shown in and described with respect to FIG. 3, or a similar system. In this case the first capacitive sensing pad may be one or a plurality of differently sized capacitive sensing pads coupled (e.g., in parallel) to the first input of the processing circuitry. Thus, the size of the area in which the first user input is received may be related to the size of the first capacitive sensing pad itself, and may be used by the processing circuitry to distinguish user input received at the first capacitive sensing pad from user input received at other (e.g., differently sized) capacitive sensing pads also coupled to the first input.

In 410, a second signal may be received by the first input. The second signal may indicate a size on an area in which second user input is received. The size of the area in which the second user input is received may be different than the size of the area in which the first user input is received.

In 412, a location of the second user input may be determined by the processing circuitry. The determination of the location of the second user input may be performed in accordance with the system configuration; multiple possible system configurations are envisioned.

In a system configuration such as shown in and described with respect to FIG. 2, or a similar system, the second signal may be generated by the first capacitive sensing pad, e.g., in response to receiving the second user input at the first capacitive sensing pad. In this case, determination of the location of the second user input may be a determination of the relative location of the second user input on the first capacitive sensing pad. More particularly, in this case, the processing circuitry may determine a direction of movement of user input along the first capacitive sensing pad based on the first signal and the second signal. The determination of direction of movement may be based on a difference between the sizes of the areas in which the first and second user inputs are received, e.g., as indicated by the first and second signals.

The first and second user inputs may, in some embodiments, be received in close succession with a plurality of additional user inputs, e.g., in the case of a finger swipe, stylus stroke, or other continuous directional motion by a user controlled input object along the first capacitive sensing pad. In this case, the first capacitive sensing pad may generate signals for each of the received user inputs, which may be received by the first input, and interpreted by the processing circuitry. The processing circuitry may, for example, interpret one or more of a range of motion along the first capacitive sensing pad, a speed of motion along the first capacitive sensing pad, and (as previously noted) a directionality of motion along the first capacitive sensing pad. The processing circuitry may make these interpretations based on the indications of the sizes of the areas in which each user input is received, e.g., as indicated by the respective signals generated based on the respective user inputs.

In a system configuration such as shown in and described with respect to FIG. 3, or a similar system, the second signal may be generated by a second capacitive sensing pad, e.g., in response to receiving the second user input at the second capacitive sensing pad. The second capacitive sensing pad may be differently sized than the first capacitive sensing pad. Accordingly, as previously noted, the size of the area in which the second user input is received may be different than the size of the area in which the first user input is received. In this case, because of the different sizes of the first and second capacitive sensing pads, the first and second signals' indications of the sizes of the areas in which the first and second user inputs are received may be used to identify the first and second signals as indicating that the location of the first and second user inputs are the first and second capacitive sensing pads, respectively.

Furthermore, in some embodiments, the first and second user inputs may be received simultaneously at the first and second capacitive sensing pads, respectively. Accordingly, the first input may receive the first and second signals simultaneously. The first input may be configured to receive signals from the first and second capacitive sensing pads additively (e.g., the first and second capacitive sensing pads may be coupled to the first input in parallel). Thus, in this case, the first input may receive a signal which is a combination of the first signal and the second signal. The processing circuitry may determine, based on receiving the first signal and the second signal simultaneously, that the first user input is received at the first capacitive sensing pad and the second user input is received at the second capacitive sensing pad simultaneously. In other words, the processing circuitry may be configured to detect multiple simultaneous touches to multiple capacitive sensing pads.

Embodiments are further envisioned in which one or more additional (e.g., differently sized) capacitive sensing pads may also be coupled to the first input, where each additional capacitive sensing pad is configured to generate a signal based on received user input. Each signal may, for example, indicate a size of a respective capacitive sensing pad in which the user input is received. The processing circuitry may accordingly be configured to determine locations of any user input received at any of the capacitive sensing pads coupled to the first input, regardless of whether the user inputs are received individually or in combination. In other words, the processing circuitry may be configured to distinguish between any possible combination of single-or multi-touches to any of the capacitive sensing pads coupled to the first input, based on indications of sizes of (individual or combined) areas in which user input is received.

It should be noted that system configurations utilizing both slider-type applications (e.g., such as shown in and described with respect to FIG. 2) and multi-touch applications (e.g., such as shown in and described with respect to FIG. 3) may be combined in a single electronic device. For example, an electronic device might include processing circuitry with a plurality of inputs. At least one of the inputs might be coupled to a geometrically based slider-type capacitive sensing input, such as shown in FIG. 2, while at least one of the inputs might be coupled to a plurality of geometrically based capacitive sensing pads intended for detection of multi-touches, such as shown in FIG. 3. However, these different types of applications may also be implemented individually, if desired.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An electronic device, comprising:
   a first capacitive sensing pad configured to receive first user input;
      wherein the first capacitive sensing pad is configured to generate a first signal based on the first user input,
      wherein the first signal indicates a size of an area of the first capacitive sensing pad in which the first user input is received;
   a second capacitive sensing pad configured to receive second user input,
      wherein the second capacitive sensing pad is differently sized than the first capacitive sensing pad;
      wherein the second capacitive sensing pad is configured to generate a second signal based on the second user input,
      wherein the second signal indicates a size of an area of the second capacitive sensing pad in which the second user input is received;
   processing circuitry,
      wherein the processing circuitry comprises a first input coupled to the first capacitive sensing pad and the second capacitive pad;
      wherein the first input is configured to additively receive the first signal from the first capacitive sensing pad and the second signal from the second capacitive sensing pad;
      wherein, based on the first input, the processing circuitry is configured to determine the locations of the user inputs on the first and second capacitive pads.

2. The electronic device of claim 1, wherein the first input is configured to receive a second signal, wherein the second signal indicates a size of an area in which second user input is received; wherein the size of the area in which second user input is received is different than the size of the area in which the first user input is received; wherein the processing circuitry is configured to determine a location of the second user input based on the second signal.

3. The electronic device of claim 2, wherein the first capacitive sensing pad is configured to receive the second user input and generate the second signal; wherein the processing circuitry is configured to determine a direction of movement along the first capacitive sensing pad based on the first signal and the second signal.

4. The electronic device of claim 3, wherein the processing circuitry is configured to determine the direction of movement along the first capacitive sensing pad based on a difference between the sizes of the areas in which the first and second user inputs are received as indicated by the first and second signals.

5. The electronic device of claim 3, wherein the first capacitive sensing pad is in the shape of an acute triangle.

6. The electronic device of claim 2, wherein the first input receives the first signal and the second signal additively.

7. The electronic device of claim 1, wherein the first user input is received at the first capacitive sensing pad and the second user input is received at the second capacitive sensing pad simultaneously; wherein the first signal and the second signal are simultaneously received by the first input; wherein processing circuitry is configured to determine that the first user input is received at the first capacitive sensing pad and the second user input is received at the second capacitive sensing pad simultaneously based on receiving the first signal and the second signal simultaneously.

8. The electronic device of claim 1, wherein the processing circuitry is configured to discriminate between the first and second signals received on the first input.

9. A method for receiving user input at an electronic device, the method comprising:
  receiving, by a first capacitive sensing pad, first user input;
  receiving, by a second capacitive sensing pad, second user input, wherein the second capacitive sensing pad is differently sized than the first capacitive sensing pad;
  generating by the first capacitive sensing pad, a first signal, wherein the first signal indicates a size of an area in which the first user input is received;
  generating by the second capacitive sensing pad, a second signal, wherein the second signal indicates a size of an area in which the second user input is received;
  receiving, by a first input coupled to the first capacitive sensing pad and second capacitive sensing pad, the first signal and the second signal, additively; wherein the first input is comprised in processing circuitry;
  determining, by the processing circuitry, the locations of the user inputs on the first and second capacitive pads.

10. The method of claim 9, further comprising: receiving, by the first input, a second signal, wherein the second signal indicates a size of an area in which second user input is received; wherein the size of the area in which second user input is received is different than the size of the area in which the first user input is received; determining, by the processing circuitry, a location of the second user input based on the second signal.

11. The method of claim 10, further comprising: receiving, by the first capacitive sensing pad, the second user input; generating, by the first capacitive sensing pad, the second signal; determining, by the processing circuitry, a direction of movement along the first capacitive sensing pad based on the first signal and the second signal.

12. The method of claim 11, wherein said determining the direction of movement along the first capacitive sensing pad is based on a difference between the sizes of the areas in which the first and second user inputs are received as indicated by the first and second signals.

13. The method of claim 11, wherein the first capacitive sensing pad is in the shape of an acute triangle.

14. The method of claim 10, wherein the first input receives the first signal and the second signal additively.

15. The method of claim 9, the method further comprising:
  receiving the first user input at the first capacitive sensing pad simultaneously with receiving the second user input at the second capacitive sensing pad; receiving the first signal at the first input simultaneously with the second signal; determining, by the processing circuitry, that the first user input is received at the first capacitive sensing pad and the second user input is received at the second capacitive sensing pad simultaneously based on receiving the first signal and the second signal simultaneously.

16. The method of claim 9, wherein determining the locations of the user inputs on the first and second capacitive pads by the processing circuitry is accomplished by discriminating between the first and second signals received on the first input.

17. An electronic device, comprising:
  a plurality of capacitive sensing pads each configured to receive user input,
    wherein each of the plurality of capacitive sensing pads is differently sized;
    wherein each capacitive sensing pad is configured to generate a signal based on received user input,
    wherein each signal indicates a size of a respective capacitive sensing pad in which a user input is received;
  processing circuitry,
    wherein the processing circuitry comprises a first input coupled to the plurality of capacitive sensing pads;
    wherein the first input is configured to additively receive each signal from the plurality of capacitive sensing pads;
    wherein the processing circuitry is configured to determine, based on the first input, a location of the received user input on each of the plurality of capacitive sensing pads.

18. The electronic device of claim 17, wherein the processing circuitry is configured to determine locations of a plurality of simultaneously received user inputs based on signals received from at least a subset of the plurality of capacitive sensing pads.

19. The electronic device of claim 17, wherein the plurality of capacitive sensing pads are connected to the first input in parallel, wherein the first input receives signals from the plurality of capacitive sensing pads in an additive manner.

20. The electronic device of claim 17, wherein the processing circuitry is configured to discriminate between each signal received on the first input.

* * * * *